United States Patent
Dinu (10) Patent No.: US 12,451,826 B2
(45) Date of Patent: Oct. 21, 2025

(54) ADJUSTABLE PHASE ADVANCE FOR PM MOTOR CONTROL

(71) Applicant: Goodrich Control Systems, West Midlands (GB)

(72) Inventor: Andrei Dinu, Leicester (GB)

(73) Assignee: Goodrich Control Systems, Solihull (GB)

( * ) Notice: Subject to any disclaimer, the term of this patent is extended or adjusted under 35 U.S.C. 154(b) by 200 days.

(21) Appl. No.: 18/143,841

(22) Filed: May 5, 2023

(65) Prior Publication Data

US 2023/0361704 A1    Nov. 9, 2023

(30) Foreign Application Priority Data

May 9, 2022    (EP) ..................................... 22275063

(51) Int. Cl.
*H02P 21/28*    (2016.01)
*H02P 21/00*    (2016.01)

(52) U.S. Cl.
CPC .......... *H02P 21/28* (2016.02); *H02P 21/0003* (2013.01); *H02K 2213/03* (2013.01); *H02P 2205/03* (2013.01); *H02P 2207/05* (2013.01)

(58) Field of Classification Search
CPC .. H02P 21/28; H02P 21/0003; H02P 2205/03; H02P 2207/05; H02K 2213/03
USPC .................................................... 318/400.02
See application file for complete search history.

(56) References Cited

U.S. PATENT DOCUMENTS

| | | | |
|---|---|---|---|
| 7,075,264 B2 | 7/2006 | Huggett et al. |
| 7,135,828 B2 | 11/2006 | Lin |
| 7,436,139 B2 | 10/2008 | Maslov et al. |
| 8,593,091 B2 | 11/2013 | Kahler |
| 9,455,659 B2 | 9/2016 | Bonnett et al. |
| 10,361,648 B2 | 7/2019 | Wang |
| 10,439,526 B2 | 10/2019 | Tian |

(Continued)

FOREIGN PATENT DOCUMENTS

| | | | |
|---|---|---|---|
| EP | 2453573 A1 | * | 5/2012 |
| EP | 3331153 A1 | | 6/2018 |

(Continued)

OTHER PUBLICATIONS

Iwashita et al. (EP 2453573 A1) Motor Control Device Date Published May 16, 2012 (Year: 2012) (Year: 2012).*

(Continued)

*Primary Examiner* — Jorge L Carrasquillo (57) ABSTRACT

There is provided herein a method of advancing phase of a DQ reference frame in a Field Oriented Control, FOC, algorithm for a permanent magnet motor. The method comprises: monitoring a component of the stator voltage demand of the permanent magnet motor, when the component of the stator voltage demand surpasses a threshold, calculating a phase advance angle, $\theta_{adv}$, based on a gain multiplied by the difference between the component of stator voltage demand and the threshold; and advancing phase of the DQ reference frame in the FOC algorithm based on the calculated phase advance angle, up to a maximum phase advance angle when motor speed is positive, or down to a minimum phase angle when motor speed is negative.

20 Claims, 6 Drawing Sheets

(56) References Cited

U.S. PATENT DOCUMENTS

| 11,165,381 B2 | 11/2021 | Jian et al. |
| 2011/0285332 A1* | 11/2011 | Pollock .................. H02P 21/18 318/400.02 |

FOREIGN PATENT DOCUMENTS

| JP | 3183356 B2 * | 7/2001 |
| JP | 2012210059 A * | 10/2012 |

OTHER PUBLICATIONS

Suzuki et al. (JP 2012210059 A)Jmotor Control Device Date Published Oct. 25, 2012 (Year: 2012) (Year: 2012).*
(JP 3183356 B2) Method And Apparatus For Driving Brushless DC Motor Date Published Jul. 9, 2001 (Year: 2001) (Year: 2001).*
Extended European Search Report for European Patent Application No. 22275063.0, dated Oct. 11, 2022.

* cited by examiner

ADJUSTABLE PHASE ADVANCE FOR PM MOTOR CONTROL

CROSS-REFERENCE TO RELATED APPLICATIONS

This application claims priority to and the benefit of European Patent Application No. 22275063.0 filed May 9, 2022, the entire content of which is incorporated herein by reference.

FIELD

This invention relates to motor control, and specifically, adjusting the amount of phase advance for permanent magnet motor control based on Vq and/or Vd voltage.

BACKGROUND

Figure 1:
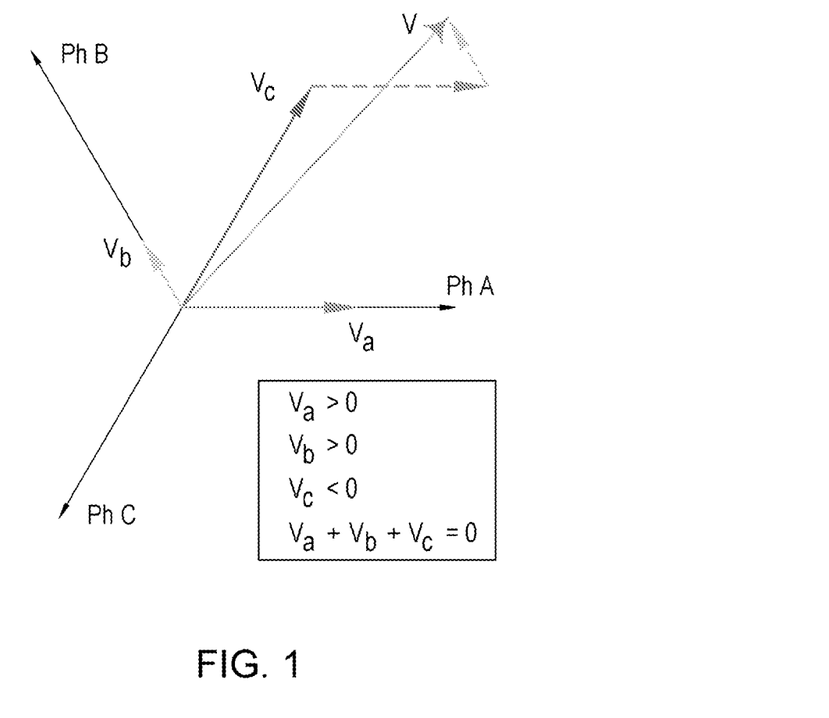
FIG. 1 is a diagram of the space vector concept.

The control of permanent magnet synchronous motors (PMSM) is often based on Field Oriented Control (FOC) algorithms. Such algorithms rely on the concept of visualising the "space vector" which is an aggregation of three equivalent phase quantities, such as phase currents, phase voltage or phase magnetic fluxes. Each phase quantity can be represented as a vector aligned to an axis, each axis corresponding to the physical position of an associated motor winding. In this way, for a three-phase electric motor, the three individual phase vectors are oriented 120 degrees apart. The space vector is then the vectorial summation of the three individual phase vectors, as illustrated in FIG. 1.

Figure 2:
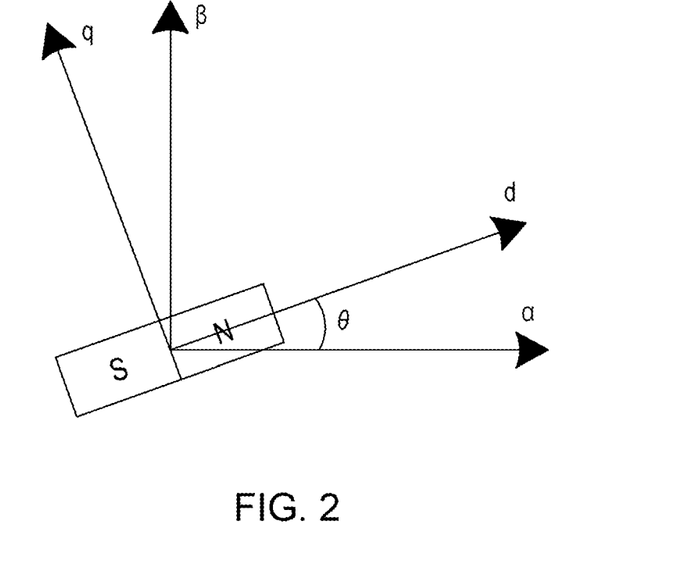
FIG. 2 is a diagram of the Alpha-Beta and DQ reference frames, and how they relate to the position of the stator coils and the rotor respectively.

FOC algorithms operate in a pair of two-dimensional reference frames. These are the fixed Alpha-Beta ($\alpha,\beta$) reference frame and the spinning DQ reference frame. The Alpha-Beta reference frame is oriented such that the Alpha axis is in the direction of motor phase A (i.e. aligned with Ph. A of FIG. 1), while axis Beta is perpendicular on Alpha. The DQ reference frame is then fixed relative to the orientation of the rotor, and therefore its absolute orientation changes as the rotor rotates. This reference frame defines a direct axis (D-axis) oriented along the direction of the North pole of the rotor magnet, and a quadrature axis (Q-axis) which is perpendicular on the D-axis, as shown in FIG. 2. It can be said that the D-axis defines the direction of the magnetic flux of the rotor, while (in a non-salient motor), the Q-axis defines the direction of the torque-producing current component of the rotor.

The goal of the FOC algorithms is to maximize the motor torque production for a given current or equivalently, to minimize the current needed to produce the necessary torque. For non-salient permanent magnet (PM) motors, this is achieved by ensuring that the current vector is aligned with the Q-axis of the DQ reference frame.

Figure 3:
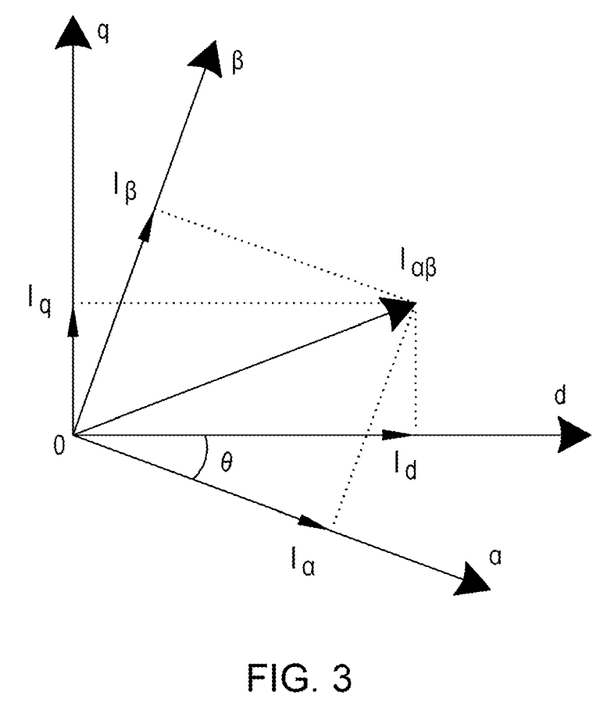
FIG. 3 is a diagram of motor current vector coordinates in Alpha-Beta and in DQ reference frames.

Said another way, it is desirable that the applied motor current vector is always perpendicular to the magnetic field of the rotor. This is achieved by calculating the appropriate voltage vector needed to produce the required motor phase currents (e.g. a current vector aligned only with the Q-axis). The typical operation steps of implementing a FOC algorithm are summarized as follows:

1. Measure motor phase currents ($I_a$, $I_b$, $I_c$).
2. Calculate the coordinates ($I_\alpha$, $I_\beta$) of the motor current vector in the fixed Alpha-Beta reference frame (this is known as the Clarke transform).
3. Use $I_\alpha$, $I_\beta$ to calculate the current vector coordinates ($I_d$, $I_q$) in the spinning DQ reference frame (this is known as the Park transform). This step is illustrated in FIG. 3.
4. Calculate the voltage coordinates ($V_d$, $V_q$) in the DQ system to ensure that D-axis current $I_d$ is stable at 0 A (i.e. that the current vector lies on the Q-axis, so as to solely generate torque), while the Q-axis current $I_q$ is set in accordance with the motor torque required to achieve the desired speed.
5. Convert the voltage coordinates ($V_d$, $V_q$) to Alpha-Beta coordinates ($V_\alpha$, $V_\beta$), thereby providing an appropriate voltage vector needed to produce the required motor phase currents, which would therefore produce the required motor current vector. This is the inverse Park transform.
6. Convert the voltage coordinates ($V_\alpha$, $V_\beta$) to individual phase voltages $V_a$, $V_b$, $V_c$ to be provided to each motor phase by the power inverter. This is the inverse Clarke transform.

In an ideal system, the produced motor current vector would lie solely along the rotating Q-axis at all time, therefore maximising torque production for a given current. However, due to the inductive nature of the motor, the voltage vector and the current vector will not necessarily be in phase. Therefore, whilst the D-axis current is zero, the D-axis voltage is not zero as shown in FIG. 4.

$V_d$ is negative when the motor speed is positive, and it is positive otherwise. Whilst it is generally recognised that a positive motor speed relates to anticlockwise rotation of the vectors in FIG. 4, it would be appreciated that the same applies for an opposite rotation, with the sign of $V_d$ swapped as appropriate. The Q-axis voltage $V_q$ is dependent on the motor speed because it has to overcome the motor back-emf, which is equivalent to a voltage vector aligned to the Q-axis of the motor and is proportional to the motor speed (as shown in FIG. 4).

Figure 4:
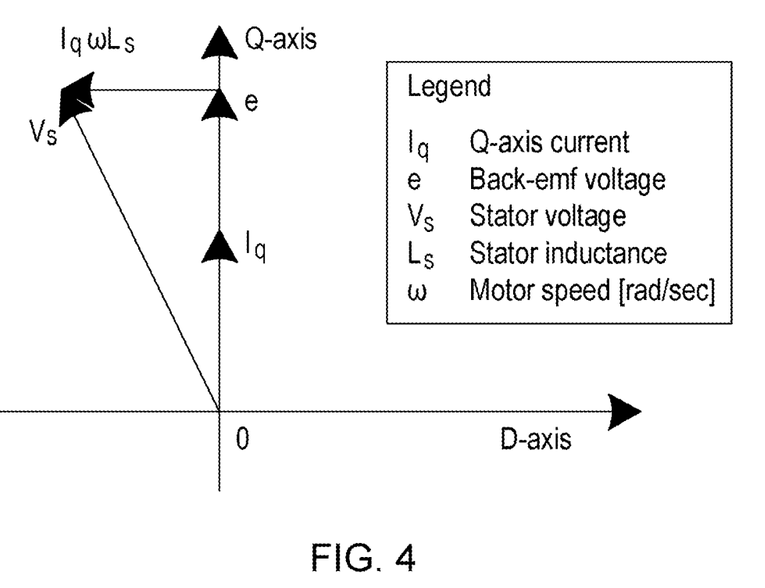
FIG. 4 is a diagram as to how, under typical operation, the voltage vector and the current vector of a PM motor are not in phase.

The difference between the stator voltage ($V_s$) provided by the power inverter and the back-emf (e), as shown in FIG. 4, is a voltage drop $I_q \omega L_s$ dependent on the motor impedance and the required motor currents (i.e. the required torque). In the example of FIG. 4, the voltage drop is assumed to only be caused by stator inductance, although it would be appreciated that a small resistive voltage drop may also be present. As the back-emf increases with speed of the rotor, motors cannot be optimally controlled (i.e. controlled with a motor phase current lying solely along the Q-axis) above a certain speed limit at a given torque. When the back-emf grows so large, in combination with the voltage drop (in this example, $I_q \omega L_s$), the magnitude of $V_s$ required becomes so large that it exceeds the total amount of voltage available from the inverter, and therefore the power inverter cannot provide sufficient voltage to operate the motor at such a speed with the required torque, and in such a case, the ability to control the current and the speed is affected.

It is therefore desirable to provide an apparatus and method of motor control that allows for motors to be operated at a higher speed, whilst providing the required amount of torque.

SUMMARY

In a first aspect, there is provided a method of advancing phase of a DQ reference frame in a Field Oriented Control, FOC, algorithm for a permanent magnet motor. The method comprises: monitoring a component of the stator voltage demand of the permanent magnet motor, when the component of the stator voltage demand surpasses a threshold, calculating a phase advance angle, $\theta_{adv}$, based on a gain multiplied by the difference between the component of stator voltage demand and the threshold; and advancing phase of the DQ reference frame in the FOC algorithm based on the calculated phase advance angle, up to a maximum phase advance angle when motor speed is positive, or down to a minimum phase angle when motor speed is negative.

Such a method allows for a simple yet effective control of the phase advance for an FOC algorithm, which has typically been either calculated manually and applied using lookup tables or calculated using more complex algorithms. The phase advance is calculated based on a comparison with a component of the stator voltage demand (i.e. $V_q$ demand or $V_d$ demand directly with a threshold value for that component of stator voltage demand. In this way, if $V_q$ demand is used, this can be directly compared to a threshold based solely on a threshold value of $V_q$ demand, or if $V_d$ demand is used, this can be directly compared to a threshold based solely on a threshold value of $V_d$ demand. The set threshold can be based on the maximum voltage limit for either $V_d$ or $V_q$.

In addition, the calculated phase advance angle can be positive or negative, depending on the motor speed. In this way, the calculated phase angle can be directly used to control motors regardless of the direction in which they are operating. By tuning the thresholds, and the gain, a pseudo-optimal solution may be reached using very simple proportional control.

Accordingly, the monitored component of the stator voltage demand may be $V_q$ demand, and the threshold may be a $V_q$ threshold. The $V_q$ component is always larger than the $V_d$ component, such that sufficient control may be achieved by monitoring only the $V_q$ component and ensuring that this does not exceed the $V_q$ threshold.

In such a case, the phase advance angle may be calculated by the following equation:

$$\theta_{adv} = \begin{cases} K_{ph-adv}^q \cdot (V_q^{dem} - V_q^{thr}) \mid_0^{+\theta_{max}} & \text{If } V_q^{dem} > V_q^{thr} \\ 0 & \text{If } -V_q^{thr} \leq V_q^{dem} \leq V_q^{thr} \\ K_{ph-adv}^q \cdot (V_q^{dem} + V_q^{thr}) \mid_{-\theta_{max}}^0 & \text{If } V_q^{dem} < -V_q^{thr} \end{cases}$$

wherein $K_{ph-adv}^q$ is the gain, $V_q^{dem}$ is the $V_q$ demand, $V_q^{thr}$ is the $V_q$ threshold, $\theta_{max}$ is the maximum phase advance angle, and $-\theta_{max}$ is the minimum phase advance angle. This provides a simple, yet effective control of the phase advance angle, thereby allowing the motor to remain as efficient as possible, yet ensure that the total stator voltage remains within its limits.

Alternatively, the component of the stator voltage may be $V_d$, demand and the threshold may be a $V_d$ threshold. This may find particular use when, in order to satisfy the higher $V_q$ demand, the limit for $V_q$ is set high such that it will not be reached. However, in such a case, to maintain the total stator voltage in an acceptable limit, the limit for $V_d$ must be set suitably low. In this case, it may be desirable to monitor only $V_d$ demand, as this is the limit that is in most danger of being exceeded.

Accordingly, the phase advance angle may be calculated by the following equation:

$$\theta_{adv} = \begin{cases} -\text{Sign}(\omega_{mot}) \cdot K_{ph-adv}^d \cdot (V_d^{dem} - V_d^{thr}) \mid_{-\theta_{max}}^0 & V_d^{dem} > V_d^{thr} \\ 0 & -V_d^{thr} \leq V_d^{dem} \leq V_d^{thr} \\ -\text{Sign}(\omega_{mot}) \cdot K_{ph-adv}^d \cdot (V_d^{dem} + V_d^{thr}) \mid_0^{+\theta_{max}} & V_d^{dem} < -V_d^{thr} \end{cases}$$

wherein $K_{ph-adv}^d$ is the gain, $V_d^{dem}$ is the $V_d$ demand, $V_d^{thr}$ is the $V_d$ threshold, $\theta_{max}$ is the maximum phase advance angle, and $-\theta_{max}$ is the minimum phase advance angle. Again, this provides a simple, yet effective control of the phase advance angle, thereby allowing the motor to remain as efficient as possible, yet ensure that the total stator voltage remains within its limits, particularly if the $V_d$ limit is set very low.

The phase advance angle calculated above may be a first phase advance angle, the gain may be a first gain, the component of stator voltage demand may be $V_q$, and the threshold may be a $V_q$ threshold; and the method may further comprise: calculating a second phase advance angle based on a second gain multiplied by a difference between $V_d$ demand and a $V_d$ threshold; advancing phase of the DQ reference frame in the FOC algorithm by the largest of the first phase advance angle and the second phase advance angle when the motor speed is positive, up to a maximum phase advance angle; or advancing phase of the DQ reference frame in the FOC algorithm by the lowest of the first phase advance angle and the second phase advance angle when the motor speed is negative, down to a minimum phase advance angle.

By doing so, it is possible to monitor both critical thresholds, $V_q^{thr}$ and $V_d^{thr}$, in the calculation of a suitable phase advance process. In this way, both thresholds may be optimized such that the total stator voltage is not exceeded. Two versions of the phase advance angle may be calculated using the measured voltages $V_d$ and $V_q$ separately, and then the actual applied threshold can be selected from the greater of the two, such that neither limit is exceeded. This again allows for simple, yet effective control.

Accordingly the first phase advance angle, $\theta_{adv}^q$, may be calculated by the following equation:

$$\theta_{adv}^q = \begin{cases} K_{ph-adv}^q \cdot (V_q^{dem} - V_q^{thr}) \mid_0^{+\theta_{max}} & V_q^{dem} > V_q^{thr} \\ 0 & -V_q^{thr} \leq V_q^{dem} \leq V_q^{thr} \\ K_{ph-adv}^q \cdot (V_q^{dem} + V_q^{thr}) \mid_{-\theta_{max}}^0 & V_q^{dem} < -V_q^{thr} \end{cases}$$

wherein $K_{ph-adv}^q$ is the first gain, $V_q^{dem}$ is the $V_q$ demand, $V_q^{thr}$ is the $V_q$ threshold, $\theta_{max}$ is the maximum phase advance angle, and $-\theta_{max}$ is the minimum phase advance angle.

The second phase advance angle, $\theta_{adv}^d$, may be calculated by the following equation:

$$\theta_{adv}^d = \begin{cases} -\text{Sign}(\omega_{mot}) \cdot K_{ph-adv}^d \cdot (V_d^{dem} - V_d^{thr}) \mid_{-\theta_{max}}^0 & V_d^{dem} > V_d^{thr} \\ 0 & -V_d^{thr} \leq V_d^{dem} \leq V_d^{thr} \\ -\text{Sign}(\omega_{mot}) \cdot K_{ph-adv}^d \cdot (V_d^{dem} + V_d^{thr}) \mid_0^{+\theta_{max}} & V_d^{dem} < -V_d^{thr} \end{cases}$$

wherein $\omega_{mot}$ is the motor speed, $K_{ph-adv}^d$ is the second gain, $V_d^{dem}$ is the $V_d$ demand, $V_d^{thr}$ is the $V_d$ threshold, $\theta_{max}$ is the maximum phase advance angle, and $-\theta_{max}$ is the minimum phase advance angle.

With the above calculated angles, the applied phase advance angle may be selected from the calculated $\theta_{adv}^q$ and $\theta_{adv}^d$ by the following equation:

$$\theta_{adv} = \begin{cases} \text{Max}(\theta_{adv}^q, \theta_{adv}^d) & \omega_{mot} > 0 \\ \text{Min}(\theta_{adv}^q, \theta_{adv}^d) & \omega_{mot} \leq 0 \end{cases}$$

Accordingly, the phase angle may readily be calculated for both positive and negative motor speeds, allowing for the motor to operate at higher speeds in either direction.

Optionally, a rate of change of the phase advance angle may be limited so as to avoid fast changes of $V_q$ feeding back into the phase advance mechanism, which would in turn cause more $V_q$ and $\theta_{adv}$ instability.

Also optionally, the difference between the component of stator voltage demand and the threshold may be filtered so as to remove the effects of feedback noise.

As would be appreciated, the calculation of a suitable phase advance angle as outlined above may find use in a wider Field Oriented Control method implementing phase advance in motor control of a permanent magnet motor.

Therefore, in a second aspect, there is provided a method of Field Oriented Control, FOC, of a permanent magnet motor, the method comprising:

measuring the motor phase currents ($I_a$, $I_b$, $I_c$) of each motor phase;

calculating the coordinates ($I_\alpha$, $I_\beta$) of the motor current vector in a fixed Alpha-Beta reference frame;

measuring the position of the rotor so as to provide a DQ reference frame;

advancing the angle of the DQ reference frame as provided for in the first aspect;

using $I_\alpha$, $I_\beta$ to calculate the current vector coordinates ($I_d$, $I_q$) in the advanced DQ reference frame;

calculating the voltage coordinates ($V_d$, $V_q$) in the advanced DQ reference frame to ensure that the advanced D-axis current $I_d$ is stable at 0 A, whilst providing a desired Q-axis current;

converting the voltage coordinates ($V_d$, $V_q$) to Alpha-Beta coordinates ($V_\alpha$, $V_\beta$), thereby providing an appropriate voltage vector needed to produce the required motor phase currents;

converting the voltage coordinates ($V_\alpha$, $V_\beta$) to individual phase voltages $V_a$, $V_b$, $V_c$ to be provided to each motor winding by a power inverter.

The above method may be implemented in a control system configured to perform the method of the first aspect, and any of the options discussed above, to output a calculated phase advance for the FOC of a permanent magnet motor.

Therefore, in a third aspect, there is provided a system for providing a phase advance angle for Field Oriented Control, FOC, of a permanent magnet motor, the system comprising;

means for calculating a difference between a monitored component of stator voltage demand and a threshold;

means for applying a proportional gain to the calculated difference between the monitored component of stator voltage demand and the threshold, when the monitored component of stator voltage demand exceeds the threshold; and means for outputting a phase advance angle for advancing a DQ reference frame in a FOC algorithm.

As above, the monitored component of the stator voltage demand may be $V_q$, and the threshold may be a $V_q$ threshold. Alternatively, as discussed above, the monitored component of the stator voltage demand may be $V_d$ demand, and the threshold may be a $V_d$ threshold. Also, as discussed above, two phase advance angles may be calculated, one based on $V_q$ demand and a $V_q$ threshold, and the other based on $V_d$ and a $V_q$ threshold. The applied phase angle may then be selected from the two calculated phase advance angles, as discussed above.

The method may be implemented in a motor system, with a control configured to implement FOC, with a varying phase angle as discussed above.

Therefore, in a fourth aspect, there is provided a system comprising;

a permanent magnet motor, PMM;

a power inverter configured to provide power to the PMM; and a controller configured to apply the method of the second aspect to control individual phase voltages applied by the power inverter to each motor winding of the PMM.

BRIEF DESCRIPTION OF THE DRAWINGS

Certain examples of the disclosure will now be described, by way of example only, with reference to the accompanying drawings, in which.

DETAILED DESCRIPTION

Whilst the description herein refers to only permanent magnet motors it would be appreciated that the teaching herein could be applied to any suitable motor, as far as possible. In addition, as above, a "positive" motor speed refers to an anti-clockwise rotation of the space vectors in the diagram, although it would be appreciated that, should a "positive" motor speed be considered as a clockwise rotation, the same teaching here applies, with the relevant positive/negative signs inverted.

Figure 5:
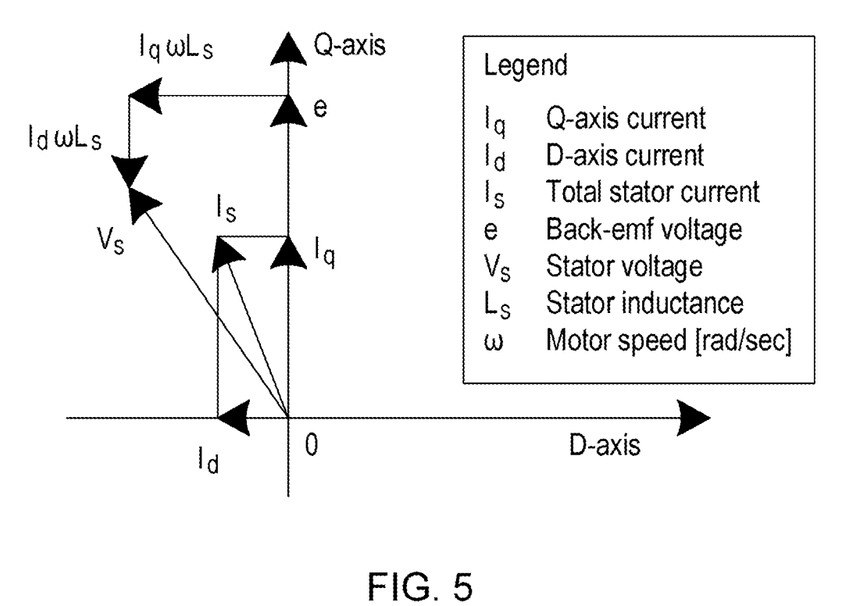
FIG. 5 is a diagram of field weakening in motor control.

In order to reduce the total magnitude of $V_s$ (for example, to a magnitude that may be supplied by the power inverter) for a given speed and torque demand, various control techniques may be applied. For example, as shown in FIG. 5, field weakening may be applied.

Field weakening is a control technique which modifies the $I_d$ current demand from 0 A to a negative value (when the motor speed is positive) or a positive value (when the motor speed is negative). This is illustrated in FIG. 5 (for positive motor speed). The current component $I_d$ causes an additional voltage drop $I_d \omega L_s$ acting perpendicular to the $I_d$ current component on the motor winding impedance which has the effect of reducing the magnitude of the total stator voltage $V_s$ required, whilst still providing the same current $I_q$ (i.e. the same torque demand). In this way, it may be said that the applied d-axis current weakens the field of the magnets, thereby reducing the amount of back-emf that has to be overcome.

However, by sacrificing the perpendicular nature of the motor currents (i.e. by shifting the motor current vector out of alignment with the Q-axis by providing an $I_d$ component), the efficiency of the motor (e.g. in kW/Nm) drops, as more power is needed to generate the same amount of torque.

Figure 6:
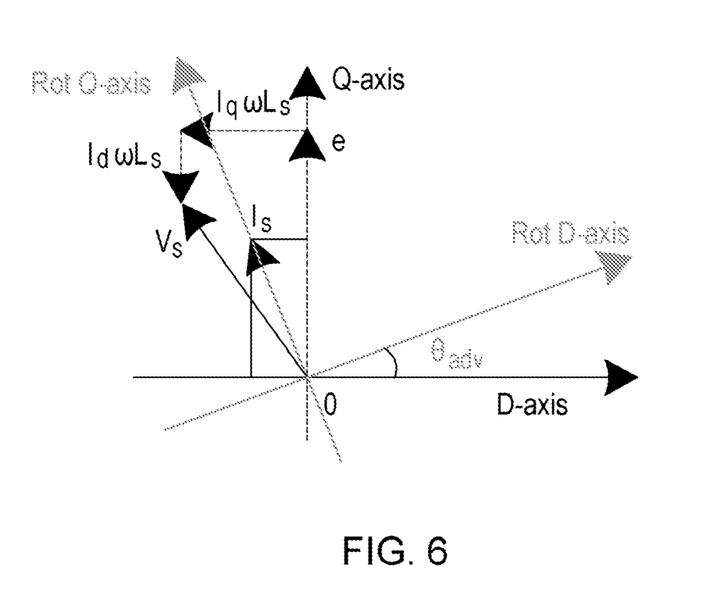
FIG. 6 is a diagram of phase advance in motor control.

The same effect is achieved by utilising phase advance. In a phase advance algorithm, the DQ reference frame (such as the DQ reference frame referred to in the FOC operation outlined above) is shifted such that the controller calculates the required phase voltages based on the fact that the rotor is at an advanced position compared to its actual position. This is illustrated in FIG. 6, where the actual DQ axis has been advanced by $\theta_{adv}$ to the rotated DQ axis. In this way, motor is controlled such that the provided D-axis current $I_d$ remains zero in the rotated DQ axis. However, in the actual DQ axis, this results in functionally the same effect of the above described field weakening, in that there is a non-zero $I_d$ component, which reduces the total $V_s$ required, as described above.

The amount of desired field weakening, or of phase advance are highly dependent on motor parameters, speed and load torque. They are usually implemented based on pre-calculated two-dimensional lookup tables that take measured speed and current demand $I_q$ for a given motor to calculate the optimal $I_d$ (for field weakening) or rotation angle $\theta$ (for phase advance). These lookup tables are populated with large number of values extracted from simulation models or from experimental results. However, such calculations/experiment are very time consuming, which is a disadvantage to product development timescales.

There is therefore a need to provide a universal method of control that can calculate an optimal amount of phase advance for a given speed without the need for pre-populated tabular data.

It is therefore proposed that an amount of phase advance can be calculated using a formula which relates generic features such as components of the voltage demand to a desired amount of phase advance. For example, such a formula may be based solely on $V_q$, solely on $V_d$, or a mixture of the two.

As above, under normal operation, it is desirable for $i_d$ to equal zero, such that the motor phase currents are aligned with the Q axis, and therefore the motor can be most efficiently operated. However, as described above, as the speed of the motor increases, and therefore so does the back-emf as well as the voltage drop $I_q \omega L_s$, the required magnitude of $V_s$ increases above the total voltage that can be applied by the power inverter. Therefore, it is desirable to apply phase advance control, only when the maximum voltage is close to being reached, such that efficiency of the motor remains as high as possible, for as long as possible.

However, when the maximum voltage is close to being reached, then it becomes necessary to apply phase advance, such that the maximum voltage of the power inverter is not reached.

As would be appreciated, the magnitude of $V_s$ can be calculated by a relatively simple Pythagorean calculation as follows in equation 1:

$$V_s = \sqrt{V_d^2 + V_q^2} \qquad \text{Equation 1}$$

Due to the fact that the voltage component $V_q$ is always larger than $V_d$, because $V_q$ includes the motor back-emf, while $V_d$ includes only the inductive voltage drop on the stator windings, then usually, limiting the value of $V_q$ takes precedence over $V_d$.

Therefore, it may be possible to monitor only $V_q$ in determining how much phase advance should be applied.

Therefore, in order to maximize efficiency, phase advance may only be applied as the $V_q$ demand threshold is reached. Therefore, there may be defined a critical threshold $V_q^{thr}$, above which, the phase advance process begins. As would be appreciated, this threshold may be any threshold that is suitable for the desired use. Even though $V_q$ is always larger than $V_d$, the threshold should take into account the presence of $V_d$, and therefore cannot simply be set at (or very close to) 100%. For example, the threshold may be set at around 75% of the maximum voltage available from the power inverter. In this way, no phase advance is applied when $V_q < V_q^{thr}$, as the total voltage supplied will be safely within the limits of the power inverter, and it is desired that the most efficient operation of the motor occurs.

Then, once $V_q$ surpasses the critical threshold (e.g. due to an increase in speed of the motor, increasing the back-emf and the voltage drop associated with $I_q$), the phase advance angle may be varied. With an increasing of phase angle, $I_d$ increases, thereby increasing the amount of associated voltage drop, reducing the magnitude of the required $V_s$ as described above. As the speed further increases (thereby increasing the back emf and voltage drop associated with $I_q$), more phase advance angle may be required so as to increase the voltage drop associated with $I_d$.

Therefore, above $V_q^{thr}$, the amount of phase advance may increase linearly in proportion with $V_q - V_q^{thr}$ (i.e. the excess voltage over the threshold) up to a maximum angle $\theta_{max}$. $\theta_{max}$ is set lower than 90°, as the higher the level of phase advance, the less efficient the running of the motor is. At 90°, the actual Q-axis current would equal zero, such that no torque would be generated. Similar considerations apply when the motor speed is negative and $V_q$ is also negative. These considerations are summarized by equation 2 below, which provides calculations for both positive and negative motor speeds:

$$\theta_{adv} = \begin{cases} K_{ph-adv}^q \cdot (V_q^{dem} - V_q^{thr}) \big|_0^{+\theta_{max}} & \text{If } V_q^{dem} > V_q^{thr} \\ 0 & \text{If } -V_q^{thr} \leq V_q^{dem} \leq V_q^{thr} \\ K_{ph-adv}^q \cdot (V_q^{dem} + V_q^{thr}) \big|_{-\theta_{max}}^0 & \text{If } V_q^{dem} < -V_q^{thr} \end{cases} \qquad \text{Equation 2}$$

Figure 7:
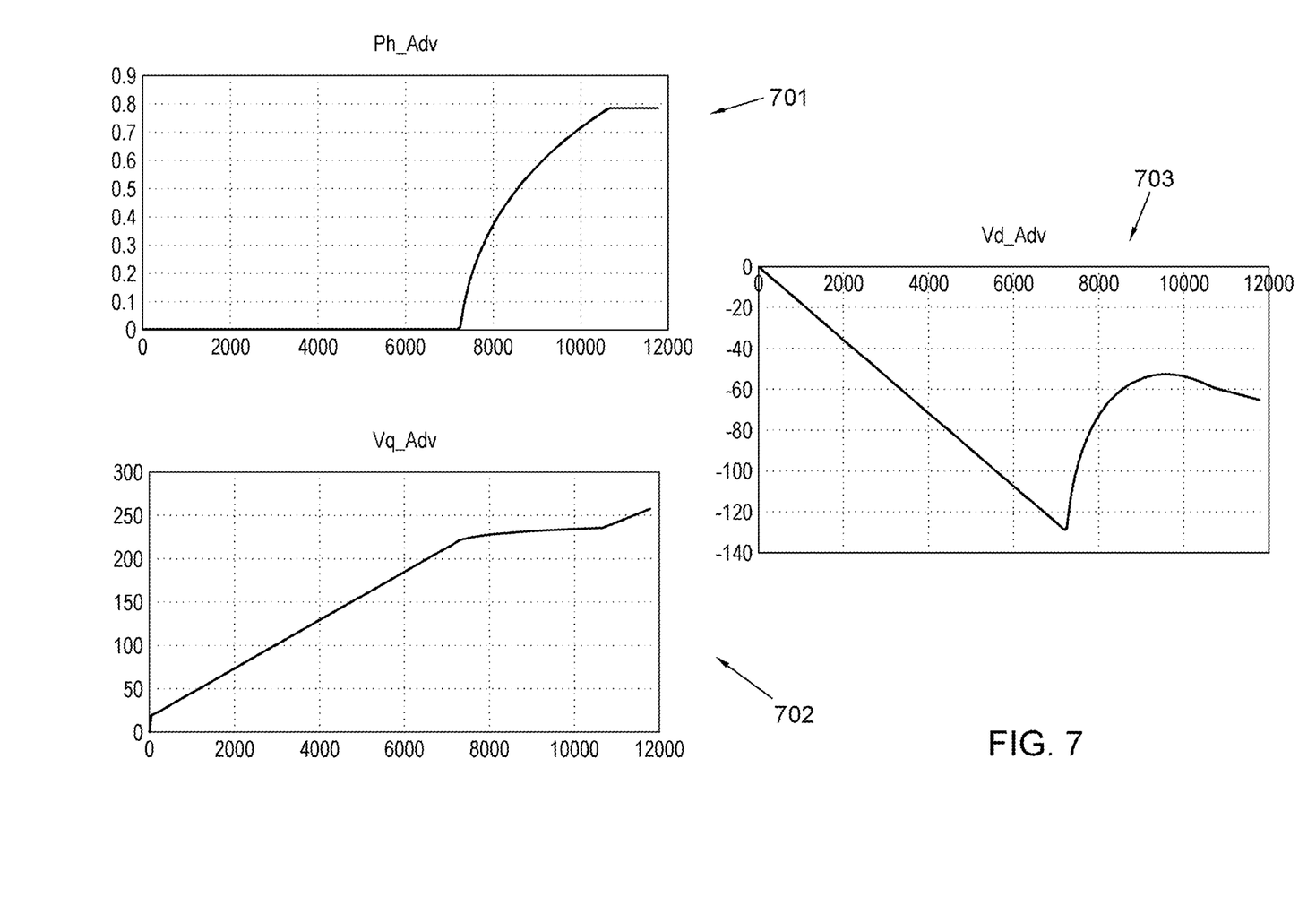
FIG. 7 shows the effect of varying phase advance based on a measure of $V_q$ on both $V_q$ and $V_d$ with increasing motor speed.

The effect of such a variable phase advance is shown in FIG. 7. FIG. 7 shows a graph 701 of phase advance angle on the y-axis (in radians) vs motor speed on the x-axis, while the associated variation of $V_q$ is shown in graph 702, and the variation of $V_d$ is shown in graph 703.

In all of these examples, the current $I_q$ is assumed constant at 50 A (i.e. that the motor has the same torque production at all speeds) and voltage threshold $V_q^{thr}$ is set at 220V. As can be seen in graph 702, the voltage $V_q$ increases roughly linearly with speed, up to the point where it reaches its set threshold level (220V), and the phase advance mechanism kicks in. At this point, the increase of $V_q$ is slowed down above $V_q^{thr}$ due to the rotation of the DQ reference frame by angle $\theta_{adv}$, in the FOC control as explained in more detail above. As can be seen in graph 703, the increasing rotor speed similarly causes an increase of $V_d$ in a negative direction at a slower rate than the corresponding increase in $V_q$. Then, once phase advance is applied, the reference frame rotation causes $V_d$ to decrease as shown in graph 703.

The net effect is a reduction of the magnitude of the total stator voltage $V_s$ which allows the motor drive system to reach speeds which would have otherwise been inaccessible due to the large value of the back-emf at such speeds. The values for critical voltage thresholds $v_q^{thr}$, phase advance gain $K_{ph-adv}^q$, as well as maximum phase advance $\theta_{max}$ may be calculated in any suitable manner, or set based on general considerations/previous experiences. For example, $\theta_{max}$ may be in the region of 45°. $K_{ph-adv}^q$ may be in the region of 1.0°/V. Additionally, $K_{ph-adv}^q$ may vary, however, this would result in a more complicated system.

In order to optimise the system, the voltage thresholds, phase advance gain, and/or the maximum phase advance may be tuned for optimal performance, for example, for maximum speed and/or maximum efficiency. Such optimal performance may still be achieved with only simple proportional gain, with a comparison between the measured voltage component, and a defined voltage threshold.

Figure 8:
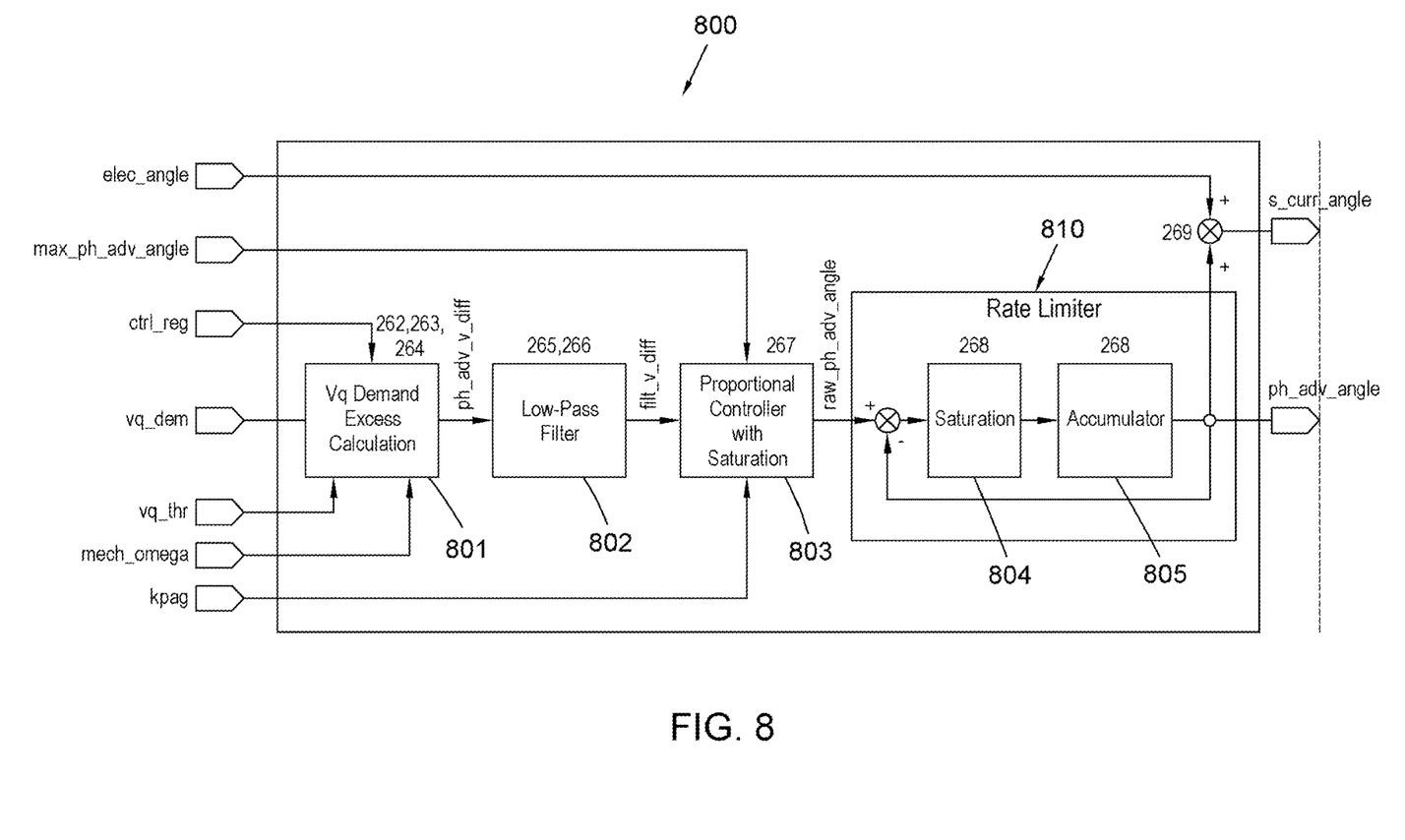
FIG. 8 shows a schematic diagram of a system configured to calculate a suitable phase advance angle based on a measure of $V_q$.

A system 800 for applying the proposed phase advance is shown in FIG. 8. First, the $V_q$ voltage excess over the threshold is calculated in block 801. Then, in order to achieve additional system stability, the calculated $V_q$ voltage excess quantity $V_q-V_q^{thr}$ passes through low-pass filter 802 so as to remove the effects of feedback noise on the control algorithm. The cutoff frequency of the filter may be set at any suitable value. For example, the cutoff frequency may be set to 10% of the current control loop bandwidth.

Then, the filtered $V_q$ voltage excess passes through proportional controller 803, which calculates a raw version of the desired phase advance angle $\theta_{adv}$ up to a maximum of $\theta_{max}$ and minimum of $\theta_{min}$ by multiplying the filtered threshold excess by a predetermined gain.

The rate of change of calculated phase advance angle $\theta_{adv}$ may be rate limited by rate limiter 810 so as to avoid fast changes of $V_q$ feeding back into the phase advance mechanism, which would in turn cause more $V_q$ and $\theta_{adv}$ instability. The maximum change rate of $\theta_{adv}$ needs to be slower than the maximum change rate of the motor current demand. The rate limiter may comprise a saturation limiter 804 and an accumulator 805. The calculated phase advance angle is then added to the measured rotor electrical angle for the purposes of the FOC control of the motor.

In addition to the monitoring of $V_q$, it may be desirable to also (or alternatively) monitor $V_d$ in determining an optimal value for phase advance. As above, as detailed in equation 1, $V_s$ depends also on $V_d$, even though $V_q$ is always larger.

However, as a result of this, $V_q$ saturation limits are usually larger than $V_d$ saturation limits. This is to make allowance for the fact that $V_q$ includes the motor back-emf and needs to be larger than $V_d$. This means that voltage $V_d$ could reach its saturation limit before $V_q$, if $V_d$ limits are set very tight in an attempt to maximize the allowed range of voltage $V_q$. In this way, threshold limits for each of $V_q$ and $V_d$ may be set in accordance with equation 3:

$$V_s^{max} > \sqrt{(V_d^{thr})^2 + (V_q^{thr})^2} \qquad \text{Equation 3}$$

In view of the above, it may be desirable to monitor two critical thresholds, $V_q^{thr}$ and $V_d^{thr}$, to decide the beginning of the phase advance process. They need to be set such that the condition in equation 3 holds true. For instance, if $V_q$ limit is set to 90% of the maximum voltage available from the power inverter, then the $V_d$ limit will be set to less than 43.5% of the maximum voltage.

Therefore, in order to prevent the excursions of both $V_d$ and $V_q$ demands above their respective thresholds, two versions of the phase advance angle may be calculated using the measured voltages $V_d$ and $V_q$ separately. Angle $\theta_{adv}^q$ is calculated in accordance with equation 4, which mirrors equation 2 outlined above. At the same time, a second phase advance angle $\theta_{adv}^d$ is calculated based on a new equation, equation 5. In order to limit excess demands above their threshold, the selected phase advance of the motor may then be the phase advance which is maximal in absolute value, which will therefore result in the lowest value for $V_s$. This means the maximum of the two angles when they are positive, or the minimum when they are negative. This can be decided based on the measured motor speed, as shown in equation 6.

$$\theta_{adv}^q = \begin{cases} K_{ph-adv}^q \cdot (V_q^{dem} - V_q^{thr})\big|_0^{+\theta_{max}} & V_q^{dem} > V_q^{thr} \\ 0 & -V_q^{thr} \leq V_q^{dem} \leq V_q^{thr} \\ K_{ph-adv}^q \cdot (V_q^{dem} + V_q^{thr})\big|_{-\theta_{max}}^0 & V_q^{dem} < -V_q^{thr} \end{cases} \qquad \text{Equation 4}$$

$$\theta_{adv}^d = \begin{cases} -\text{Sign}(\omega_{mot}) \cdot K_{ph-adv}^d \cdot \\ (V_d^{dem} - V_d^{thr})\big|_{-\theta_{max}}^0 & V_d^{dem} > V_d^{thr} \\ 0 & -V_d^{thr} \leq V_d^{dem} \leq V_d^{thr} \\ -\text{Sign}(\omega_{mot}) \cdot K_{ph-adv}^d \cdot \\ (V_d^{dem} + V_d^{thr})\big|_0^{+\theta_{max}} & V_d^{dem} < -V_d^{thr} \end{cases} \qquad \text{Equation 5}$$

$$\theta_{adv} = \begin{cases} \text{Max}(\theta_{adv}^q, \theta_{adv}^d) & \omega_{mot} > 0 \\ \text{Min}(\theta_{adv}^q, \theta_{adv}^d) & \omega_{mot} \leq 0 \end{cases} \qquad \text{Equation 6}$$

As shown above, the phase advance angle is zero when $V_q < V_q^{thr}$ and $V_d < V_d^{thr}$ simultaneously (i.e. when neither saturation voltage is close to being met). Then, as the saturation limits approach, the phase advance increases when $V_d$ reaches its threshold, and then the increase rate changes when $V_q$ reaches its threshold too.

Figure 9:
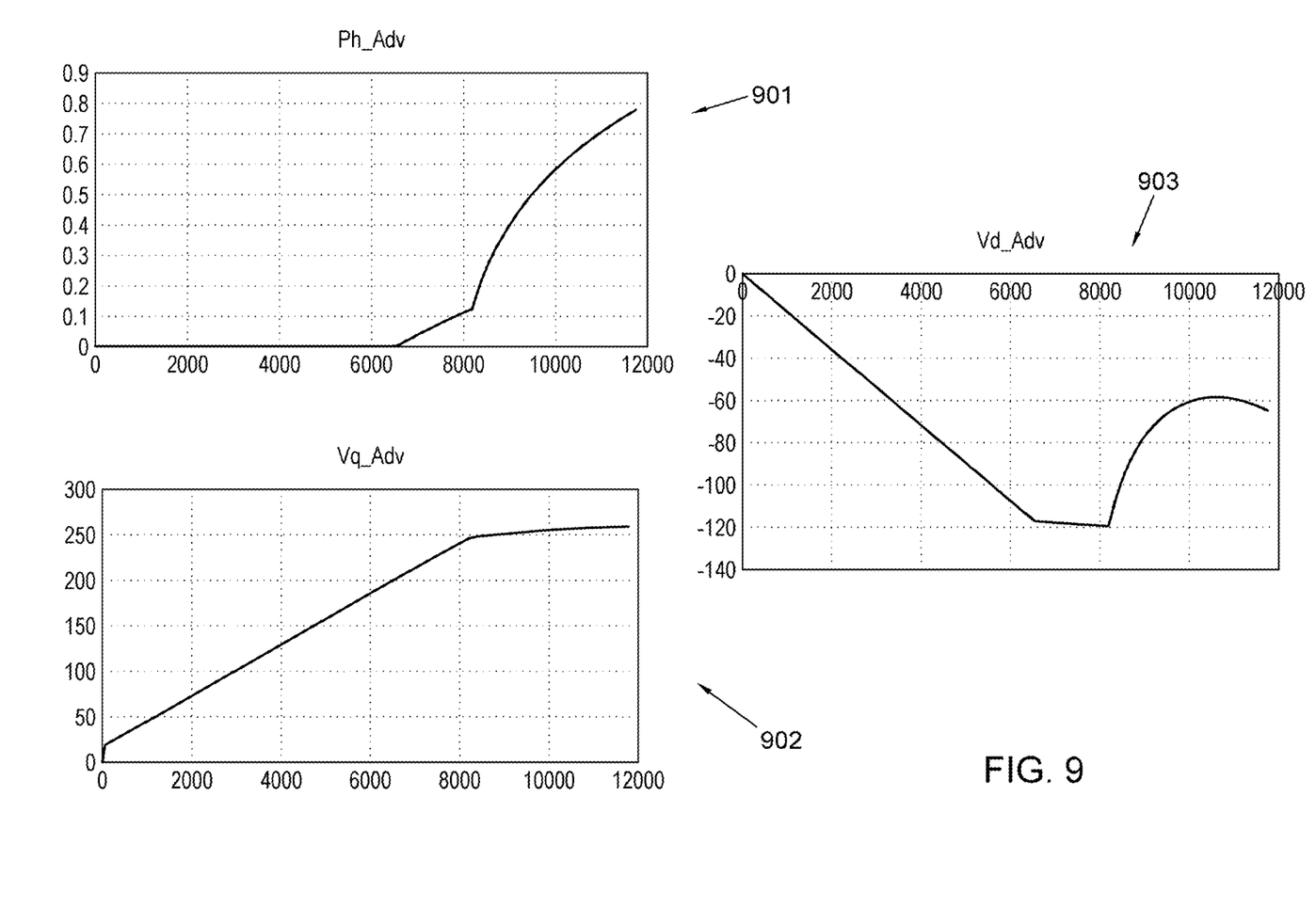
FIG. 9 shows the effect of varying phase advance based on a measure of both $V_q$ and $V_d$, on both $V_q$ and $V_d$ with increasing motor speed.

This effect is shown in FIG. 9. The typical phase advance angle vs motor speed is shown in graph 901, while the associated variations of $V_d$ and $V_q$ are shown in graphs 903 and 904 respectively. The current $I_q$ is again assumed constant at 50 A (i.e. that there is the same torque production at all speeds), voltage threshold $V_q^{thr}$ is set at 243V while threshold $V_d^{thr}$ is set at 117V, which represents 90% and 43.5% of the maximum voltage available in system supplied from a standard 540V dc bus using standard sinusoidal PWM modulation. An additional margin of 15% may be achieved by using Space Vector Modulation (SVM) instead of sinusoidal PWM, which would provide the necessary inverter voltage margin above the thresholds.

As can be seen, both $V_d$ and $V_q$ increase roughly linearly with speed up to the point where $V_d$ reaches its threshold level and the phase advance mechanism kicks in. The increase of $V_d$ is slowed down above $V_d^{thr}$ due to the rotation of the DQ reference frame by angle $\theta_{adv}$ calculated in equation 5. The increase of the phase advance angle with speed becomes then more pronounced when $V_q$ reaches its threshold. This causes $V_d$ to actually decrease when $V_q > V_q^{thr}$, as shown in graph 903. The net effect is that, when the phase advance is non-zero, the total stator voltage Vs is maintained within the range available from the power inverter. This allows the motor drive system to reach speeds which would be otherwise innaccessible due to the large value of the back-emf.

For the above a monitoring of $V_d$ and $V_q$ a similar system to that illustrated in FIG. 8 may be applied.

In this way, additional system stability may be achieved by including a low-pass filter on the $V_q$ voltage excess quantity $V_q-V_q^{thr}$ of equation 4, and $V_d$ voltage excess $V_d-V_d^{thr}$ in equation 5. This removes the effects of feedback noise on the control algorithm. Again, the cutoff frequency of the filter may be set to any suitable value. For example, the cutoff frequency may be to 10% of the current control loop bandwidth. Furthermore, the angle $\theta_{adv}$ can be rate limited to avoid fast changes of $V_q$ feeding back into the phase advance mechanism and causing more $V_q$ and $\theta_{adv}$ instability. Again, the maximum change rate of $\theta_{adv}$ should be slower than the maximum change rate of the motor current demand.

Equally, there may be a situation in which the $V_d$ limit is set so tight, that the $V_q$ limit will not be reached before the $V_d$ limit. In such a case, it may be that only the $V_d$ limit needs to be monitored for the purpose of modifying the phase advance angle, for example, using only the equation for $\theta_{adv}^d$ set out above in equation 5. Again, for such a case, a similar system to that shown in FIG. 8 may be provided.

By monitoring $V_q$ and/or $V_d$ voltage excess, it is possible to provide an effective yet simple and generic phase advance algorithm for permanent magnet motor controllers. This is simpler and more robust than a traditional algorithm that is based on precalculated angles stored in a two-dimensional lookup table as a function of speed and current demand, and is implemented using only a simple proportional control. Such an algorithm calculates the optimal phase advance angle based on the values of Q-axis motor voltage ($V_q$) compared to a threshold value of $V_q$ and/or D-axis motor voltage ($V_d$) compared to a threshold value of $V_d$, without requiring explicit information about motor parameters and their variability with temperature, saturation levels etc. In this way, all of the relevant interactions between motor speed, back-emf, phase currents, phase voltages are distilled into one or two parameters $V_q$ and/or $V_d$ which is directly measurable by the motor controller. In addition, the control functions effectively whether the motor operates with a positive or negative speed, allowing a motor to operate at a faster speed in either direction.

By monitoring both $V_q$ and/or $V_d$ voltage excess over their individual thresholds, it is possible to maximize the allowed range of voltage $V_q$ (which is larger than $V_d$), even if this reduces the allowed range of voltage $V_d$. Such an algorithm is capable of adjusting the phase advance angle such that both $V_d$ and $V_q$ are simultaneously adjusted to remain within their allowed value ranges, thereby maximizing the possible operating speed of a motor with a given inverter.

It will be appreciated by those skilled in the art that the disclosure has been illustrated by describing one or more specific examples, but is not limited to these examples; many variations and modifications are possible within the scope of the accompanying claims.

The invention claimed is:

1. A method of advancing phase of a DQ reference frame in a Field Oriented Control (FOC) algorithm for a permanent magnet motor, the method comprising:
   monitoring a component of a stator voltage demand of the permanent magnet motor, wherein the component comprises one or more components of a Park transformation;
   either (i) calculating a phase advance angle based on a gain multiplied by a difference between the component of the stator voltage demand and the threshold of the component if the component of the stator voltage demand exceeds a threshold of the component or (ii) setting the phase advance angle to zero if the component of the stator voltage demand is within the threshold of the component; and
   advancing the phase of the DQ reference frame in the FOC algorithm based on the phase advance angle either (i) up to a maximum phase advance angle when motor speed is positive or (ii) down to a minimum phase advance angle when the motor speed is negative;
   wherein the motor speed is positive based on one of a clockwise rotation or an anticlockwise rotation of a motor current vector and a motor voltage vector about a Q-axis and negative based on another of the clockwise rotation or the anticlockwise rotation of the motor current vector and the motor voltage vector about the Q-axis.

2. The method of claim 1, wherein:
   the component of the stator voltage demand is a quadrature component of the Park transformation; and
   the threshold is a quadrature component threshold.

3. The method of claim 2, wherein the phase advance angle is calculated as:

$$\theta_{adv} = \begin{cases} K_{ph-adv}^q \cdot \left(V_q^{dem} - V_q^{thr}\right)|_0^{+\theta_{max}} & \text{If } V_q^{dem} > V_q^{thr} \\ 0 & \text{If } -V_q^{thr} \le V_q^{dem} \le V_q^{thr} \\ K_{ph-adv}^q \cdot \left(V_q^{dem} + V_q^{thr}\right)|_{-\theta_{max}}^0 & \text{If } V_q^{dem} < -V_q^{thr} \end{cases}$$

wherein $\theta_{adv}$ is the phase advance angle, $K_{ph-adv}^q$ is the gain, $V_q^{dem}$ is the quadrature component, $V_q^{thr}$ is the quadrature component threshold, $\theta_{max}$ is the maximum phase advance angle, and $-\theta_{max}$ is the minimum phase advance angle.

4. The method of claim 1, wherein:
   the component of the stator voltage demand is a direct component of the Park transformation; and
   the threshold is a direct component threshold.

5. The method of claim 4, wherein the phase advance angle is calculated as:

$$\theta_{adv} = \begin{cases} -\text{Sign}(\omega_{mot}) \cdot K_{ph-adv}^d \cdot \left(V_d^{dem} - V_d^{thr}\right)|_{-\theta_{max}}^0 & V_d^{dem} > V_d^{thr} \\ 0 & -V_d^{thr} \le V_d^{dem} \le V_d^{thr} \\ -\text{Sign}(\omega_{mot}) \cdot K_{ph-adv}^d \cdot \left(V_d^{dem} + V_d^{thr}\right)|_0^{+\theta_{max}} & V_d^{dem} < -V_d^{thr} \end{cases}$$

wherein $\theta_{adv}$ is the phase advance angle, $\omega_{mot}$ is the motor speed, $K_{ph-adv}^d$ is the gain, $V_q^{dem}$ is the direct component, $V_q^{thr}$ is the direct component threshold, $\theta_{max}$ is the maximum phase advance angle, and $-\theta_{max}$ is the minimum phase advance angle.

6. The method of claim 1, wherein:
   the phase advance angle is a first phase advance angle, the gain is a first gain, the component of the stator voltage demand is a quadrature component of the Park transformation, and the threshold is a quadrature component threshold; and
   the method further comprises:
      calculating a second phase advance angle based on a second gain multiplied by a difference between a direct component of the Park transformation and a direct component threshold; and
      one of:
         advancing the phase of the DQ reference frame in the FOC algorithm by a largest of the first phase advance angle and the second phase advance angle when the motor speed is positive, up to the maximum phase advance angle; or
         advancing the phase of the DQ reference frame in the FOC algorithm by a lowest of the first phase advance angle and the second phase advance angle when the motor speed is negative, down to the minimum phase advance angle.

7. The method of claim 6, wherein the first phase advance angle is calculated as:

$$\theta_{adv}^q = \begin{cases} K_{ph-adv}^q \cdot \left(V_q^{dem} - V_q^{thr}\right)\big|_0^{+\theta_{max}} & V_q^{dem} > V_q^{thr} \\ 0 & -V_q^{thr} \leq V_q^{dem} \leq V_q^{thr} \\ K_{ph-adv}^q \cdot \left(V_q^{dem} + V_q^{thr}\right)\big|_{-\theta_{max}}^0 & V_q^{dem} < -V_q^{thr} \end{cases}$$

wherein $\theta_{adv}$ is the first phase advance angle, $K_{ph-adv}^q$ is the first gain, $V_q^{dem}$ is the quadrature component, $V_q^{thr}$ is the quadrature component threshold, $\theta_{max}$ is the maximum phase advance angle, and $-\theta_{max}$ is the minimum phase advance angle.

8. The method of claim 7, wherein the second phase advance angle is calculated as:

$$\theta_{adv}^d = \begin{cases} -\text{Sign}(\omega_{mot}) \cdot K_{ph-adv}^d \cdot \left(V_d^{dem} - V_d^{thr}\right)\big|_{-\theta_{max}}^0 & V_d^{dem} > V_d^{thr} \\ 0 & -V_d^{thr} \leq V_d^{dem} \leq V_d^{thr} \\ -\text{Sign}(\omega_{mot}) \cdot K_{ph-adv}^d \cdot \left(V_d^{dem} + V_d^{thr}\right)\big|_0^{+\theta_{max}} & V_d^{dem} < -V_d^{thr} \end{cases}$$

wherein $\theta_{adv}^q$ is the second phase advance angle, $\omega_{mot}$ is the motor speed, $K_{ph-adv}^d$ is the second gain, $V_d^{dem}$ is the direct component, $V_d^{thr}$ is the direct component threshold, $\theta_{max}$ is the maximum phase advance angle, and $-\theta_{max}$ is the minimum phase advance angle.

9. The method of claim 8, wherein the phase advance angle is selected from the first and second phase advance angles as:

$$\theta_{adv} = \begin{cases} \text{Max}(\theta_{adv}^q, \theta_{adv}^d) & \omega_{mot} > 0 \\ \text{Min}(\theta_{adv}^q, \theta_{adv}^d) & \omega_{mot} \leq 0 \end{cases}.$$

10. The method of claim 1, further comprising limiting a rate of change of the phase advance angle.

11. The method of claim 1, further comprising filtering the difference between the component of the stator voltage demand and the threshold so as to remove effects of feedback noise.

12. A system comprising:
a permanent magnet motor (PMM);
a power inverter configured to provide power to the PMM; and
a controller configured to apply the method of claim 11 to control individual phase voltages applied by the power inverter to each motor winding of the PMM.

13. A method of Field Oriented Control (FOC) of a permanent magnet motor, the method comprising:
measuring motor phase currents of each motor phase;
calculating coordinates of a motor current vector in a fixed Alpha-Beta reference frame;
measuring a position of a rotor so as to provide a DQ reference frame;
advancing an angle of the DQ reference frame as claimed in claim 1 to generate an advanced DQ reference frame;
using the coordinates of the motor current vector to calculate current vector coordinates in the advanced DQ reference frame;
calculating voltage coordinates in the advanced DQ reference frame to ensure that an advanced D-axis current is stable at 0 A while providing a desired Q-axis current;
converting the voltage coordinates to Alpha-Beta coordinates; and
converting the voltage coordinates to individual phase voltages to be provided to each motor winding by a power inverter.

14. A system for providing a phase advance angle for Field Oriented Control (FOC) of a permanent magnet motor, the system comprising:
a controller configured to:
monitor a component of a stator voltage demand of the permanent magnet motor, wherein the component comprises one or more components of a Park transformation;
calculate a difference between the component of the stator voltage demand and a threshold of the component;
either (i) calculate the phase advance angle based on a proportional gain applied to the calculated difference between the component of the stator voltage demand and the threshold of the component if the component of the stator voltage demand exceeds the threshold of the component or (ii) set the phase advance angle to zero if the component of the stator voltage demand is within the threshold of the component; and
output the phase advance angle for advancing a DQ reference frame in a FOC algorithm based on the phase advance angle either (i) up to a maximum phase advance angle when motor speed is positive or (ii) down to a minimum phase advance angle when the motor speed is negative;
wherein the motor speed is positive based on one of a clockwise rotation or an anticlockwise rotation of a motor current vector and a motor voltage vector about a Q-axis and negative based on another of the clockwise rotation or the anticlockwise rotation of the motor current vector and the motor voltage vector about the Q-axis.

15. The system of claim 14, wherein:
the component of the stator voltage demand is a quadrature component of the Park transformation; and
the threshold is a quadrature component threshold.

16. The system of claim 15, wherein the controller is configured to calculate the phase advance angle as:

$$\theta_{adv} = \begin{cases} K_{ph-adv}^q \cdot \left(V_q^{dem} - V_q^{thr}\right)\big|_0^{+\theta_{max}} & \text{if } V_q^{dem} > V_q^{thr} \\ 0 & \text{if } -V_q^{thr} \leq V_q^{dem} \leq V_q^{thr} \\ K_{ph-adv}^q \cdot \left(V_q^{dem} + V_q^{thr}\right)\big|_{-\theta_{max}}^0 & \text{if } V_q^{dem} < -V_q^{thr} \end{cases}$$

wherein $\theta_{adv}$ is the phase advance angle, $K_{ph-adv}^q$ is the gain, $V_q^{dem}$ is the quadrature component, $V_q^{thr}$ is the quadrature component threshold, $\theta_{max}$ is the maximum phase advance angle, and $-\theta_{max}$ is the minimum phase advance angle.

17. The system of claim 14, wherein:
the component of the stator voltage demand is a direct component of the Park transformation; and
the threshold is a direct component threshold.

18. The system of claim 17, wherein the controller is configured to calculate the phase advance angle as:

$$\theta_{adv} = \begin{cases} -\text{Sign}(\omega_{mot}) \cdot K_{ph-adv}^d \cdot \left(V_q^{dem} - V_q^{thr}\right)\big|_{-\theta_{max}}^0 & V_q^{dem} > V_q^{thr} \\ 0 & -V_q^{thr} \leq V_q^{dem} \leq V_q^{thr} \\ -\text{Sign}(\omega_{mot}) \cdot K_{ph-adv}^q \cdot \left(V_q^{dem} + V_q^{thr}\right)\big|_0^{+\theta_{max}} & V_q^{dem} < -V_q^{thr} \end{cases}$$

wherein $\theta_{adv}$ is the phase advance angle, $\omega_{mot}$ is the motor speed, $K_{ph-adv}^d$ is the gain, $V_q^{dem}$ is the direct component, $V_q^{thr}$ is the direct component threshold, $\theta_{max}$ is the maximum phase advance angle, and $-\theta_{max}$ is the minimum phase advance angle.

19. The system of claim 14, wherein:

the phase advance angle is a first phase advance angle, the gain is a first gain, the component of the stator voltage demand is a quadrature component of the Park transformation, and the threshold is a quadrature component threshold; and the controller is further configured to:
  calculate a second phase advance angle based on a second gain multiplied by a difference between a direct component of the Park transformation and a direct component threshold;
  advance the phase of the DQ reference frame in the FOC algorithm by a largest of the first phase advance angle and the second phase advance angle when the motor speed is positive, up to the maximum phase advance angle; and
  advance the phase of the DQ reference frame in the FOC algorithm by a lowest of the first phase advance angle and the second phase advance angle when the motor speed is negative, down to the minimum phase advance angle.

20. The system of claim 19, wherein:

the controller is configured to calculate the first phase advance angle as:

$$\theta_{adv}^q = \begin{cases} K_{ph-adv}^q \cdot (V_q^{dem} - V_q^{thr}) \Big|_0^{+\theta_{max}} & V_q^{dem} > V_q^{thr} \\ 0 & -V_q^{thr} \leq V_q^{dem} \leq V_q^{thr} \\ K_{ph-adv}^q \cdot (V_q^{dem} + V_q^{thr}) \Big|_{-\theta_{max}}^{0} & V_q^{dem} < -V_q^{thr} \end{cases}$$

wherein $\theta_{adv}$ is the first phase advance angle, $K_{ph-adv}^q$ is the first gain, $V_q^{dem}$ is the quadrature component, $V_q^{thr}$ is the quadrature component threshold, $\theta_{max}$ is the maximum phase advance angle, and $-\theta_{max}$ is the minimum phase advance angle; and the controller is configured to calculate the second phase advance angle as:

$$\theta_{adv}^d = \begin{cases} -\text{Sign}(\omega_{mot}) \cdot K_{ph-adv}^d \cdot (V_d^{dem} - V_d^{thr}) \Big|_{-\theta_{max}}^{0} & V_d^{dem} > V_d^{thr} \\ 0 & -V_d^{thr} \leq V_d^{dem} \leq V_d^{thr} \\ -\text{Sign}(\omega_{mot}) \cdot K_{ph-adv}^d \cdot (V_d^{dem} + V_d^{thr}) \Big|_0^{+\theta_{max}} & V_d^{dem} < -V_d^{thr} \end{cases}$$

wherein $\theta_{adv}^q$ is the second phase advance angle, $\omega_{mot}$ is the motor speed, $K_{ph-adv}^d$ is the second gain, $V_d^{dem}$ is the direct component, and $V_d^{thr}$ is the direct component threshold.

* * * * *